(12) United States Patent
Khuu et al.

(10) Patent No.: US 10,205,731 B2
(45) Date of Patent: Feb. 12, 2019

(54) CONTEXTUALLY-AWARE LOCATION SHARING SERVICES

(71) Applicant: Microsoft Technology Licensing, LLC, Redmond, WA (US)

(72) Inventors: Hiep V. Khuu, Issaquah, WA (US); Ashish Vijay Gadre, Kirkland, WA (US); Lisa Hwei-Min Ong, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 14/866,718

(22) Filed: Sep. 25, 2015

(65) Prior Publication Data
US 2017/0093882 A1    Mar. 30, 2017

(51) Int. Cl.
*H04L 29/06*    (2006.01)
*H04W 4/02*    (2018.01)
(Continued)

(52) U.S. Cl.
CPC ............ *H04L 63/12* (2013.01); *G01S 5/0072* (2013.01); *G01S 5/0284* (2013.01); *G01S 19/25* (2013.01);
(Continued)

(58) Field of Classification Search
CPC ....... H04L 63/107; H04L 63/10; H04L 63/14; H04L 63/20; H04W 12/08; H04W 4/02; H04W 4/023; G06Q 50/01
See application file for complete search history.

(56) References Cited

U.S. PATENT DOCUMENTS

| 6,505,049 B1 | 1/2003 | Dorenbosch |
| 6,725,051 B2 | 4/2004 | Fidler |

(Continued)

FOREIGN PATENT DOCUMENTS

| EP | 1217792 A1 | 6/2002 |
| EP | 2523013 A1 | 11/2012 |
| WO | 2011109860 A1 | 9/2011 |

OTHER PUBLICATIONS

Herrmann, Michael, et al. "Practical privacy-preserving location-sharing based services with aggregate statistics." Proceedings of the 2014 ACM conference on Security and privacy in wireless & mobile networks. ACM, 2014. pp. 87-98.*

(Continued)

*Primary Examiner* — Karl L Schmidt
(74) *Attorney, Agent, or Firm* — Scott Y. Shigeta; Newport IP, LLC

(57) ABSTRACT

Technologies are described herein for providing contextually-aware location sharing services for computing devices. In some configurations, the techniques disclosed herein can involve a number of computing devices configured to select and utilize location data from one or more resources based on one or more factors. An analysis of contextual data including, but not limited to, the capabilities of the individual devices, a status of one or more components, or the availability or cost of data, allows individual devices to dynamically select and utilize location data or a source of location data to accommodate a range of scenarios. Techniques disclosed herein can also detect the presence of a changed scenario and take one or more actions based, at least in part, on data defining the changed scenario.

17 Claims, 10 Drawing Sheets

(51) Int. Cl.

| | |
|---|---|
| *G06Q 50/00* | (2012.01) |
| *H04W 12/08* | (2009.01) |
| *G01S 19/25* | (2010.01) |
| *G01S 5/02* | (2010.01) |
| *H04W 4/20* | (2018.01) |
| *G01S 5/00* | (2006.01) |
| *G01S 19/42* | (2010.01) |
| *G01S 19/48* | (2010.01) |
| *H04W 4/80* | (2018.01) |

(52) U.S. Cl.
CPC .............. *G06Q 50/01* (2013.01); *H04L 63/10* (2013.01); *H04L 63/107* (2013.01); *H04W 4/02* (2013.01); *H04W 4/023* (2013.01); *H04W 4/20* (2013.01); *H04W 12/08* (2013.01); *G01S 5/02* (2013.01); *G01S 5/0257* (2013.01); *G01S 19/42* (2013.01); *G01S 19/48* (2013.01); *H04W 4/027* (2013.01); *H04W 4/80* (2018.02)

(56) References Cited

U.S. PATENT DOCUMENTS

| | | | |
|---|---|---|---|
| 7,027,820 | B2 | 4/2006 | Spratt |
| 7,884,758 | B2 | 2/2011 | Gruchala et al. |
| 8,072,379 | B2 | 12/2011 | Gopinath |
| 8,285,484 | B1 | 10/2012 | Lau |
| 8,331,952 | B2 | 12/2012 | Pagonis et al. |
| 8,396,377 | B2 | 3/2013 | Tse et al. |
| 8,965,348 | B1* | 2/2015 | Cronin .................. H04W 4/001 455/39 |
| 9,008,735 | B2 | 4/2015 | Annavaram et al. |
| 2002/0137526 | A1 | 9/2002 | Shinohara |
| 2002/0138671 | A1* | 9/2002 | Struble ................... H04L 67/04 710/15 |
| 2009/0037529 | A1* | 2/2009 | Armon-Kest ..... G06F 17/30206 709/204 |
| 2010/0130232 | A1* | 5/2010 | Dingler ................... H04W 4/02 455/456.3 |
| 2012/0112958 | A1* | 5/2012 | Alizadeh-Shabdiz ....................... G01S 19/48 342/357.23 |
| 2013/0045759 | A1 | 2/2013 | Smith |
| 2013/0260789 | A1* | 10/2013 | Woo ....................... H04W 4/027 455/456.1 |
| 2014/0179337 | A1* | 6/2014 | Alpert ................... H04W 64/00 455/456.1 |
| 2014/0237015 | A1* | 8/2014 | Bruins .............. H04W 52/0209 709/201 |
| 2015/0056960 | A1 | 2/2015 | Egner et al. |
| 2015/0148055 | A1* | 5/2015 | Alles ...................... G01S 5/0036 455/456.1 |
| 2015/0172395 | A1* | 6/2015 | Jackson ................... H04L 67/18 709/204 |
| 2016/0261979 | A1* | 9/2016 | Vaccari .................. H04W 4/02 |

OTHER PUBLICATIONS

W. Wei, F. Xu and Q. Li, "MobiShare: Flexible privacy-preserving location sharing in mobile online social networks," 2012 Proceedings IEEE INFOCOM, Orlando, FL, 2012, pp. 2616-2620.*

C. Yu, K. Doppler, C. B. Ribeiro and O. Tirkkonen, "Resource Sharing Optimization for Device-to-Device Communication Underlaying Cellular Networks," in IEEE Transactions on Wireless Communications, vol. 10, No. 8, pp. 2752-2763, Aug. 2011.*

"International Search Report and Written Opinion Issued in PCT Application No. PCT/US2016/051192", dated Nov. 28, 2016, 13 Pages.

Baniukevic, et al., "Hybrid Indoor Positioning With Wi-Fi and Bluetooth: Architecture and Performance", In Proceedings of IEEE 14th International Conference on Mobile Data Management, dated Jun. 3, 2013, pp. 10 pages.

Paek, et al., "Energy-Efficient Positioning for Smartphones using Cell-ID Sequence Matching", In Proceedings of 9th International Conference on Mobile Systems, Applications, and Services, dated Jun. 28, 2011, 14 pages.

Paek, et al., "Energy-Efficient Rate-Adaptive GPS-based Positioning for Smartphones", In Proceedings of 8th Annual International Conference on Mobile Systems, Applications, and Services, dated Jun. 15, 2010, 16 pages.

PCT/US2016/051192—Written Opinion, dated Apr. 20, 2017, 7 pages.

PCT/US2016/051192—International Preliminary Report on Patentability, dated Jul. 20, 2017, 8 pages.

* cited by examiner

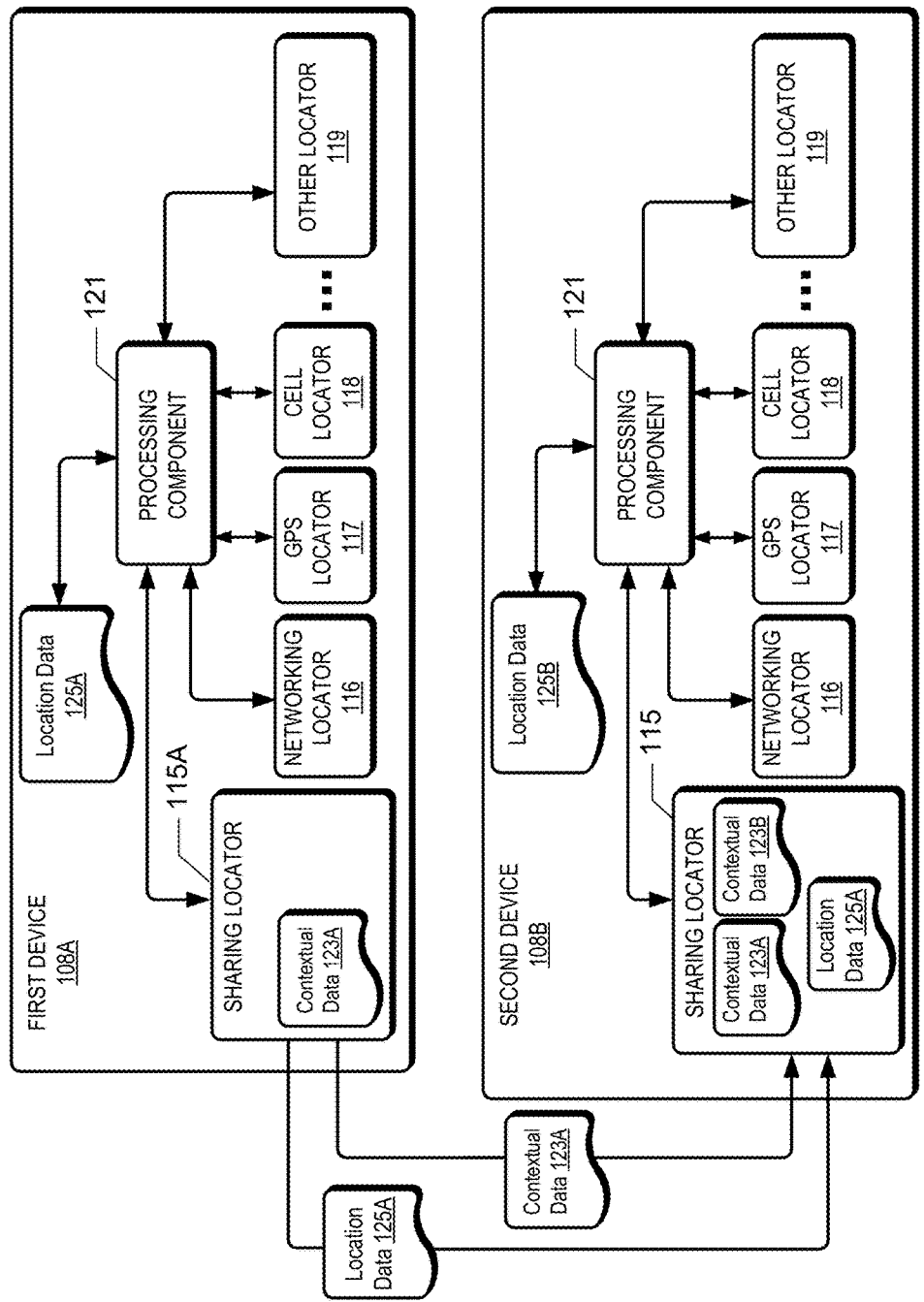

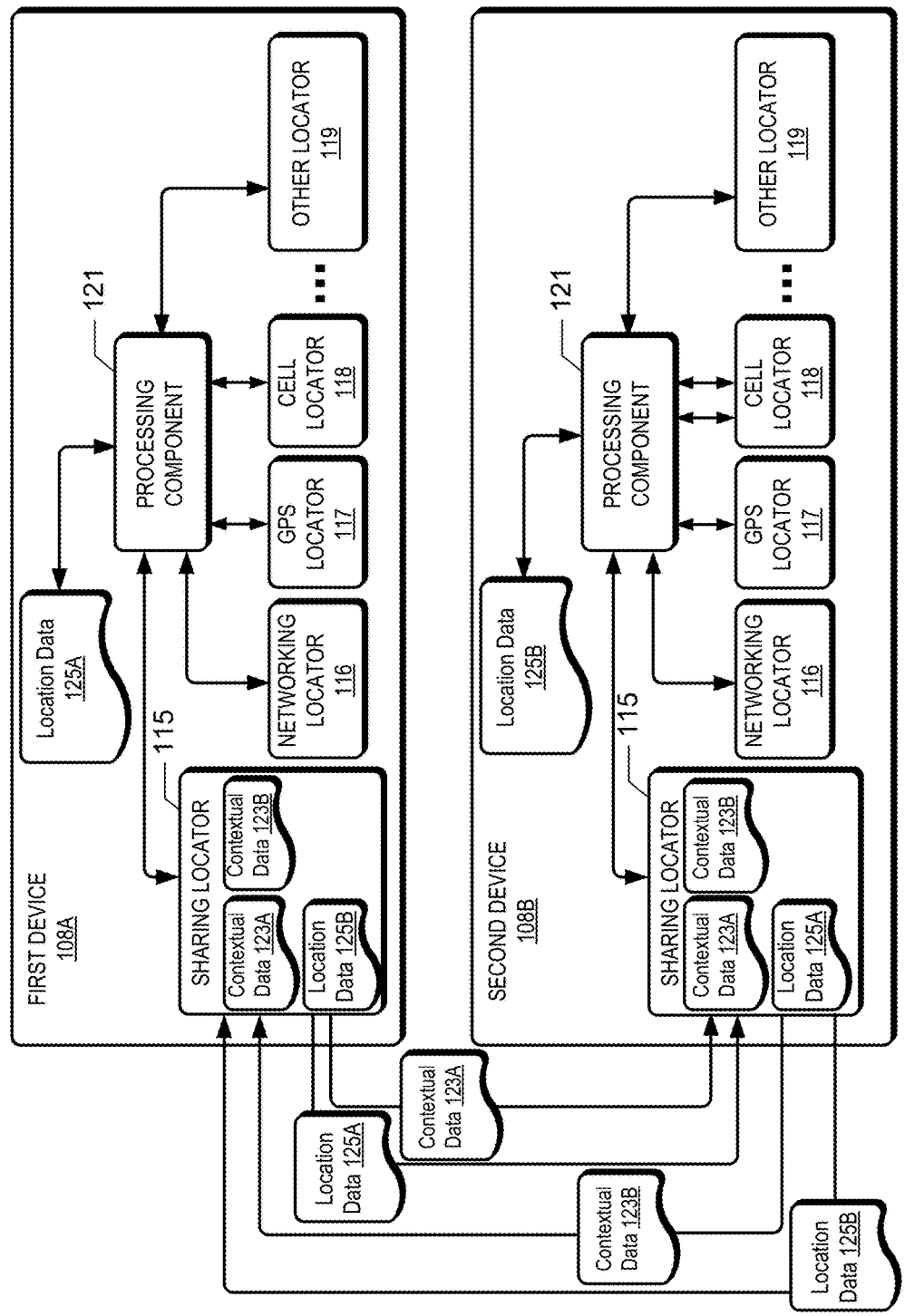

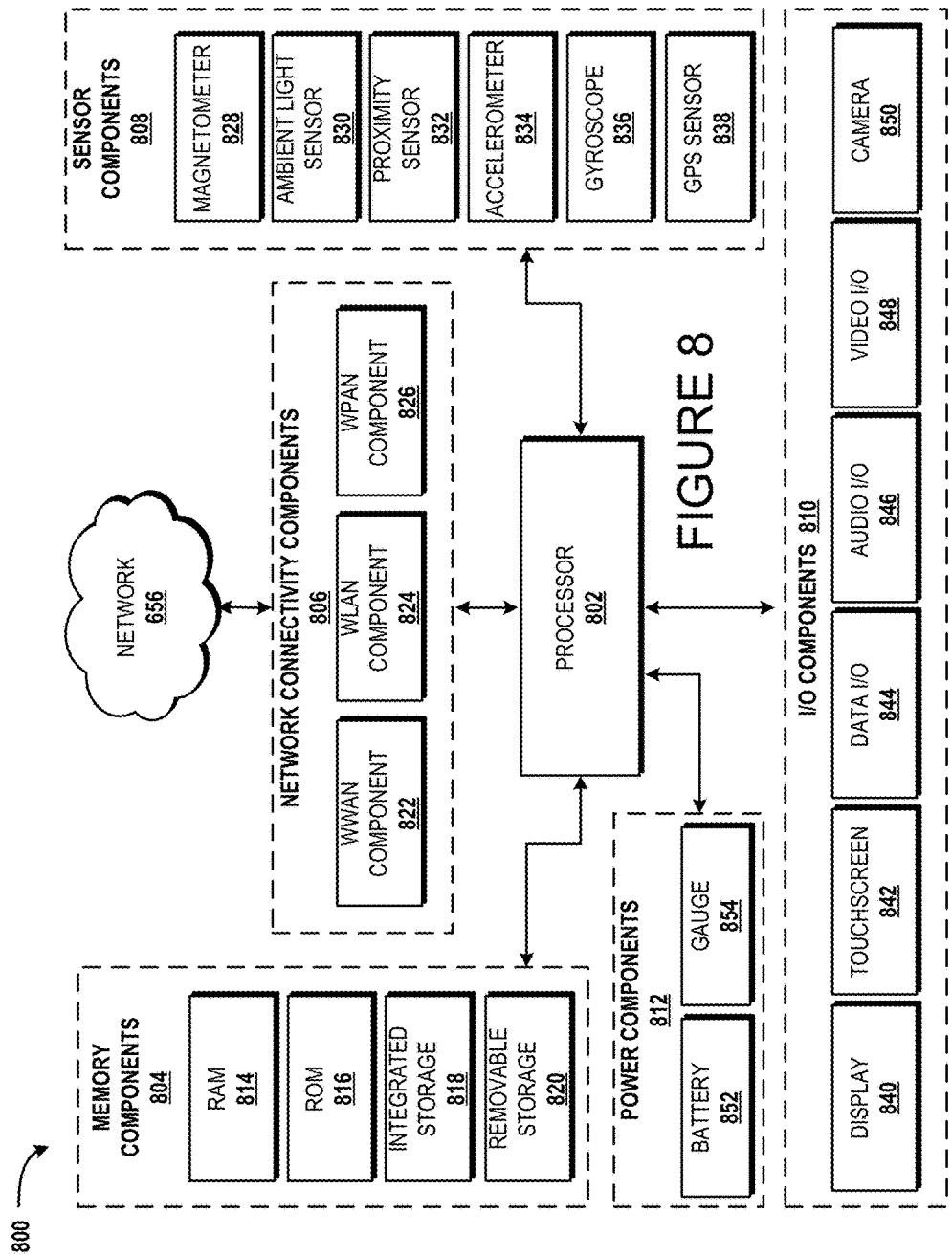

CONTEXTUALLY-AWARE LOCATION SHARING SERVICES

BACKGROUND

Computer-aided map navigation tools have achieved widespread acceptance. For example, global positioning system ("GPS") devices have provided rudimentary road navigation for years. More recently, map navigation software for cellular telephones and other mobile computing devices have been developed. Although such existing systems can provide location information for some computing devices, such systems can use a significant amount of power with adverse effects on, among other resources, battery life.

It is with respect to these and other considerations that the disclosure made herein is presented.

SUMMARY

Technologies are described herein for providing contextually-aware location sharing services for computing devices. In some configurations, the techniques disclosed herein can involve a number of computing devices that are individually configured to selectively share and utilize location data based on one or more factors that can be derived from an analysis of contextual data. The contextual data can be received from individual devices configured to share location data or the contextual data can be received from one or more services.

The contextual data can include, but is not limited to, data describing the capabilities of the individual devices, a status of one or more devices, and the availability or cost associated with the location data. In some configurations, the contextual data defines the accuracy and a cost, e.g., a level of resources, associated with location data from an individual resource. Based on an analysis of received contextual data, location data defining a location of an individual device can be selectively shared between devices to accommodate dynamically changing needs of one or more devices. The techniques disclosed herein allows individual devices to dynamically select and utilize shared location data and other location data to accommodate a range of usage scenarios.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-3B illustrate example block diagrams showing an exchange of data between two devices configured to provide contextually-aware location sharing services;

FIG. 8 is a computer architecture diagram illustrating a computing device architecture for a computing device capable of implementing aspects of the techniques and technologies presented herein.

DETAILED DESCRIPTION

Figure 1:
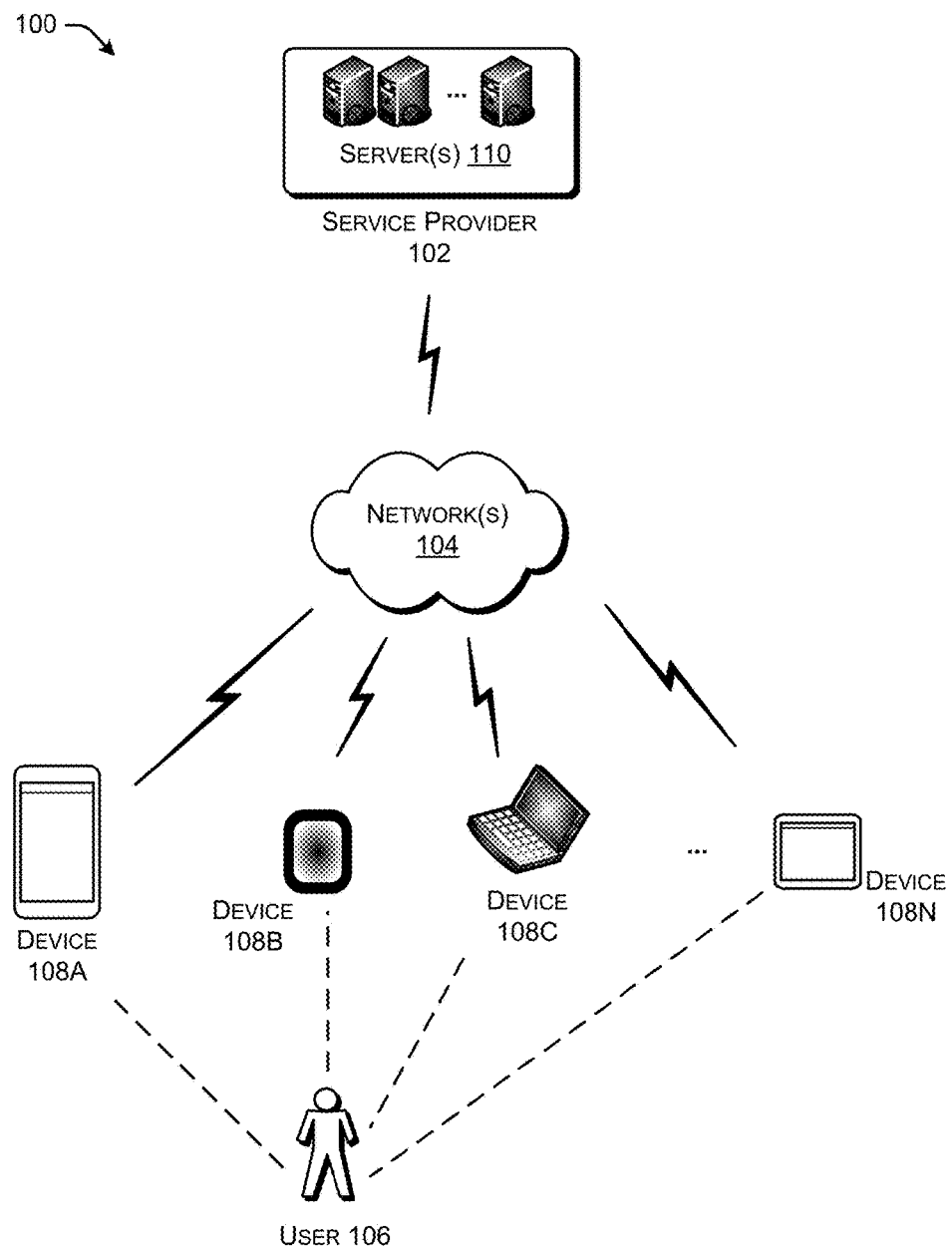
FIG. 1 is a block diagram showing several example components for providing contextually-aware location sharing services for computing devices.

The following description discloses technologies for providing contextually-aware location sharing services for computing devices. In some configurations, the techniques disclosed herein can involve a number of computing devices that are individually configured to selectively share and utilize location data based on one or more factors that can be derived from an analysis of contextual data. The contextual data can be received from individual devices configured to share location data or the contextual data can be received from one or more services.

The contextual data can include, but is not limited to, the capabilities of the individual devices, a status of one or more devices, and the availability or cost associated with the location data. In some configurations, the contextual data defines the accuracy and a cost, e.g., a level of resources, associated with location data from an individual resource. Based on an analysis of received contextual data, location data defining a location of an individual device can be selectively shared between devices to accommodate dynamically changing needs of one or more devices. The techniques disclosed herein allows individual devices to dynamically select and utilize shared location data and other location data to accommodate a range of usage scenarios.

In some configurations, a first computing device and a second computing device can detect the presence of one another and enable communication between the devices by the use of one or more technologies including, but not limited to BLUETOOTH, Near Field Communication ("NFC"), WiFi Direct, and/or other suitable technologies. As can be appreciated, WiFi Direct and other like technologies allow devices to connect without a wireless access point. Once in communication, an individual device can share contextual data indicating its capabilities. In some configurations, the contextual data can include information that can be used to define a location of the individual device. In addition, the contextual data can include accuracy data indicating the accuracy of the location data, resource data indicating a level of resources associated with the location data, and other data.

The resource data can indicate a level of resources or a rating of an individual resource providing the location data. In some configurations, resource data can indicate a level of resource that is required to obtain or compute the associated location data. For example, the resource data can indicate a level of power, bandwidth, memory usage, or any other type of cost associated with, or required, to obtain or compute associated location data. Each device can also receive contextual data from other resources, such as a remote server or other computing device. Such contextual data can indicate the availability or a fee associated with the location data or other related data.

The contextual data can be analyzed to select and/or prioritize location data generated by one or more resources. For example, a first device can be configured to receive location data from a number of resources, such as a GPS component and a WI-FI component. The first device can also be configured to receive location data from other resources, such as a second device. The first device may prioritize location data from individual resources to accommodate a scenario interpreted from the contextual data. In one illustrative example, the first device may prioritize location data received from the second computing device over location data generated by a component of the first device, e.g., a GPS component, if a cost associated with the location data of the second device is more efficient with respect to one or more resources, such as power, bandwidth, memory usage, etc. As will be explained in more detail below, the selection or prioritization of location data provided by a number of resources can be based on a number of factors.

The analysis of the contextual data can detect the presence of a particular scenario or a changed scenario and take one or more actions based on the detected scenario. For example, the contextual data can include a status of a hardware component, a status of an application utilizing location data, a modification of any data, the detection of new data, a user input and/or any other event. For example, a device may be configured to operate from a battery power source or an external power source, such as an AC outlet. When plugged into the external power source, the device can be configured to obtain location data utilizing a technology, such as a GPS component, that may have a higher level of accuracy but may consume power at a high rate. The device can be configured to detect a changed scenario, such as a transition from the external power source to the use of the battery power source. In such a scenario, another technology, such as a more energy-efficient technology for obtaining location data, e.g., the use of shared location data of another computing device, can be utilized.

By the use of the techniques disclosed herein, one or more devices can be configured to conserve resources with respect to power resources, memory resources, communication bandwidth resources, processing resources, and/or other resources while maintaining a required level of accuracy of the location data. Further, as will be described in more detail below, the analysis and utilization of contextual data received from a number of resources allow techniques disclosed herein to accommodate a number of usage scenarios. Other technical effects other than those mentioned herein can also be realized from an implementation of the technologies disclosed herein.

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings. Furthermore, the claimed subject matter is not limited to implementations that solve any or all disadvantages noted in any part of this disclosure.

While the subject matter described herein is primarily presented in the general context of techniques for providing contextually-aware location sharing services for computing devices, it can be appreciated that the techniques described herein can apply to any type of sensor and/or any type of device embodying the sensors. As will be described in more detail herein, it can be appreciated that implementations of the techniques and technologies described herein can include the use of solid state circuits, digital logic circuits, computer component, and/or software executing on one or more devices. Signals described herein can include analog and/or digital signals for communicating a changed state, movement and/or any data associated with motion detection.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing contextually-aware location sharing services for computing devices. As will be described in more detail below with respect to FIGS. 6-8, there are a number of applications and services that can embody the functionality and techniques described herein.

FIG. 1 is a system diagram showing aspects of one example environment 100 (also referred to herein as a "system 100") disclosed herein for providing contextually-aware location sharing services for computing devices. In one illustrative example, the example environment 100 can include a service provider 102, one or more networks 104, one or more users 106, and one or more devices 108A, 108B, 108C, through 108N (collectively "devices 108") associated with the one or more users 106. In the example environment 100, the user 106 can be associated with any device, such as device 108A, device 108B, and device 108C. As will be described in detail, techniques disclosed herein can involve any number of computing devices configured to detect the presence of one another and selectively share and utilize location information depending on one or more factors. This example is provided for illustrative purposes and is not to be construed as limiting. It can be appreciated that the example environment 100 can include any number of devices 108 and/or any number of service providers 102.

The service provider 102 can include any entity, platform, or service that facilitates aspects of the techniques disclosed herein. For example, one or more server(s) 110 of any service provider 102 can be used to implement aspects of the techniques disclosed herein. In addition, one or more service providers 102 can provide and communicate data, such as location data defining a location of one or more devices, other system data used to obtain location data, and/or other types of data. Details regarding the location data, system data, and other data are described in more detail in association with FIG. 2.

Individual devices 108 can operate as a stand-alone device, or the devices 108 can operate in conjunction with other computers, such as the one or more servers 110 of a service provider 102. As can be appreciated, the devices 108, servers 110 and/or any other computer are interconnected through one or more local and/or wide area networks, such as the network 104. In addition, the devices 108 can communicated using any other technology such as BLUETOOTH, NFC or any other suitable light-based, wired, or wireless technology. It should be appreciated that many more types of connections may be utilized than illustrated in FIG. 1.

The servers 110 may be in the form of a personal computer, server farm, large-scale system or any other computing system having components for processing, collecting, storing and communicating location data and other data. In some configurations, one or more service providers 102 may share or lease computing resources to provide a service for providing location data and other data. The servers 110, which can be associated with different service providers 102, can also include components, such as the components shown in FIG. 7, for providing contextual data and executing one or more aspects of the techniques described herein. As will be described in more detail herein, a server module may operate in conjunction with other modules or devices to implement aspects of the techniques disclosed herein.

Figure 2:
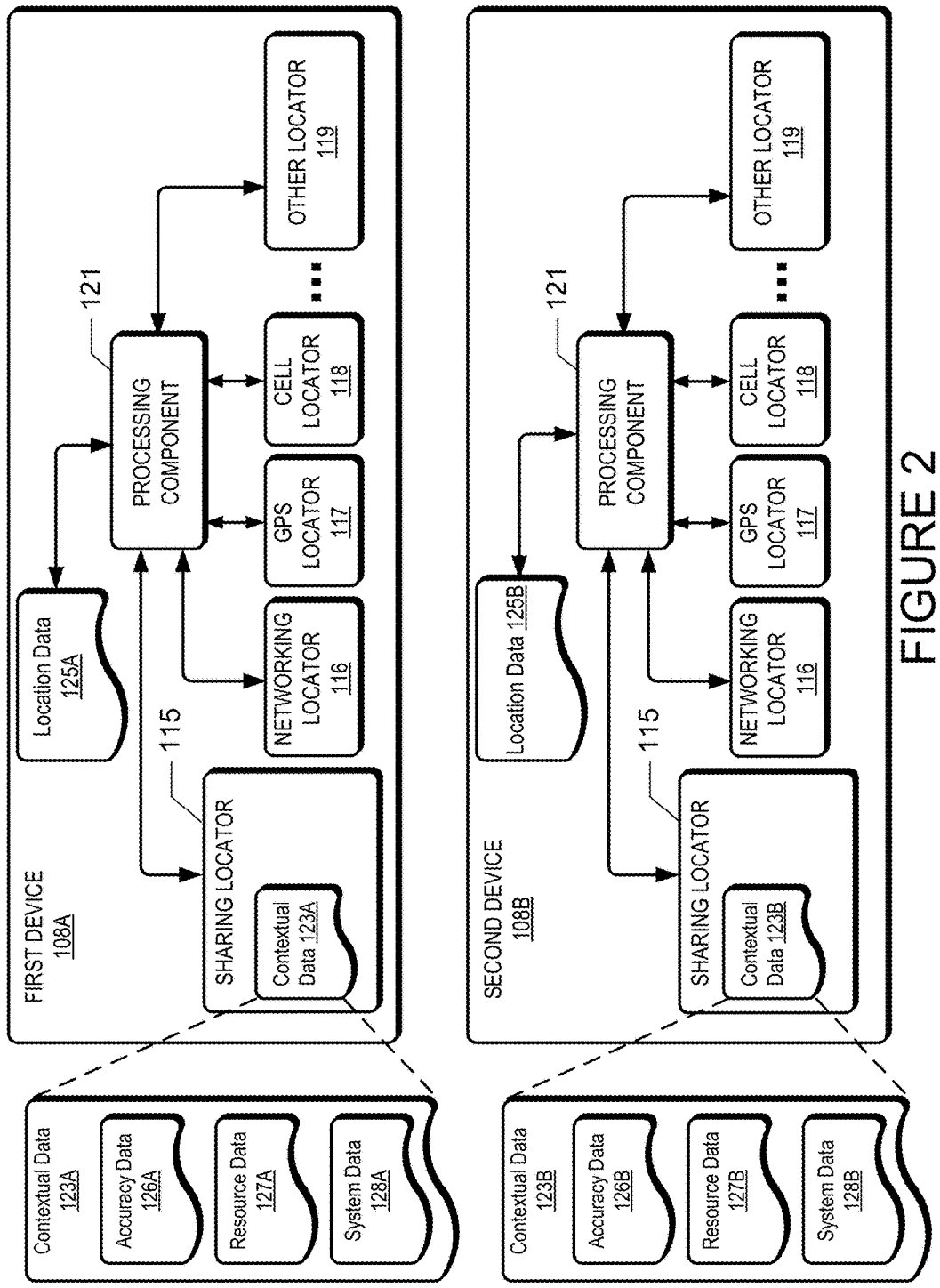
FIG. 2 illustrates an example block diagram showing several example components of two devices used for sharing location data.

With reference to FIG. 2, aspects of the devices 108 for providing contextually-aware location sharing services are shown and described below. The individual devices 108, such as the first device 108A and the second device 108B, can include a processing component 121, a sharing locator 115, a networking locator 116, a GPS locator 117, a cell locator 118, and other components (noted as "other locator 118") utilizing any suitable technology for obtaining, processing, and/or generating location data and related data. The processing component 121 can be used to coordinate and manage the locators/components 115-118 and perform aspects of the techniques disclosed herein.

In this example, the location data 125A of the first device 108A can be configured to define a location of the first device 108A. The location data 125B of the second device 108B can be configured to define a location of the second device 108B. The location data 125A of the first device 108A and the location data 125B of the second device 108B are also referred to herein as "location data 125" or "location information 125." The location data 125 can be in any format and location data 125 can be configured to define a location at any level. For example, the location data 125 can include global coordinates or any other data that defines a position or location. The location data 125 can also define a location of an object relative to another object or device.

The individual devices 108 can obtain or generate location data 125 using a variety of independent positioning technologies, e.g., GPS, cell/cellular tower look-up, WI-FI Access Point look-up, etc. For illustrative purposes, the networking locator 116, the GPS locator 117, and the cell locator 118 are configured to respectfully utilize WI-FI Access Point look-up technologies, GPS technologies, and cell tower look-up technologies. As will be described in more detail below, the sharing locator 115 is configured to obtain or provide location data 125. For example, the sharing locator 115 of the first device 108A can enable the communication of the location data 125A from the first device 108A to the second device 108B. In addition, the sharing locator 115 of the second device 108B can enable the communication of the location data 125A from the second device 108B to the first device 108A. This example is provided for illustrative purposes and is not to be construed as limiting. It can be appreciated that one or more devices 108 can be configured with fewer or more positioning technologies. For illustrative purposes, the utilization of the sharing locator 115, or configurations where location data 125 of one device is utilized by another device, is referred to herein as "location sharing."

Each technology provides location data 125 with a level of accuracy, e.g., a Quality of Service ("QoS"), and a cost associated with processing and/or obtaining location data 125. The accuracy of the location data 125 can be measured in a number of ways, including a margin of error that can be represented and quantified by a unit of measure, e.g., feet, miles, meters, kilometers, etc. For illustrative purposes, data indicating a level of accuracy or a QoS is generically referred to herein as "accuracy data 126," which may be accuracy data 126A stored on the first device 108A or accuracy data 126B stored on the second device 108B. Accuracy data 126 can be associated with any location data 125 and/or any source of location data 125, such as the sharing locator 115, networking locator 116, GPS locator 117, cell locator 118, and/or other components.

The cost associated with each technology can be measured in a variety of ways, e.g., a level of power consumption, a level of memory consumption, data-connection bandwidth usage, etc. The cost can also be associated with a fee, which may be applied to certain types of data depending on the source of the data. For illustrative purposes, data indicating or defining a cost associated with location data 125 is generically referred to herein as "resource data 127," which may include resource data 127A stored on the first device 108A or resource data 127B stored on the second device 108B. The resource data 127 may quantify, rate, characterize, or classify a level of resources using any type of unit of measure, such as a unit of power, processing cycles, memory units or other units measuring or representing resources that are associated with a process to obtain or calculate location data.

In some of the technologies described above, such as Cell tower look-up technologies, the one or more service providers (102 of FIG. 1) can generate, store, and/or communicate information that enables some devices 108 to obtain location data 125 from a system, such as a GPS. For example, system data 128 received by the devices 108 may describe one or more satellites. Such system data 128 may be utilized by the devices 108 to select resources to use, e.g., which satellites to utilize for obtaining location data 125. For illustrative purposes, "system data 128A" and "system data 128B" can be respectively associated with and/or stored on the first device 108A and the second device 108B. The system data 128 can also include a timestamp to enable one or more devices 108 to determine the freshness, e.g., an age, of the system data 125. In some configurations, one or more service providers 102 and/or devices 108 can also generate or obtain timestamp data indicating a time when the system data 128 is received and/or an age or freshness of the system data 125. Similar techniques may be applied to the location data 125 and other data to determine the freshness or age of the location data 125 and other data.

In some configurations, individual devices 108 can store, process and communicate contextual data 123, which can include the accuracy data 126, resource data 127, system data 128 and other data. For illustrative purposes, "contextual data 123A" can be stored on and/or associated with the first device 108A, "contextual data 123B" can be stored on and/or associated with the second device 108B. This example is provided for illustrative purposes and is not to be construed as limiting. It can be appreciated that various types of data, including accuracy data 126, resource data 127, system data 128, and other data can be stored, processed or generated by any component or device. For illustrative purposes, contextual data 123, which can include accuracy data 126, resource data 127, system data 128 and other data stored on and/or associated with a device 108 is also referred to herein as "capability data." For illustrative purposes, the letters of the reference numbers for data, such as accuracy data 126B, resource data 127B and other data may refer to data stored on or generated by a device 108 having a corresponding letter, such as the second device 108B, the third device 108C, etc.

As can be appreciated, some technologies have a higher QoS than other technologies. In addition, the use of multiple location tracking technologies simultaneously can improve the QoS of a location retrieval request for one or more devices 108, but such techniques can incur a heavy cost. In order to optimize the QoS of location retrieval requests while mitigating the cost, the techniques disclosed herein allow the devices 108 to share location data 125 using the sharing locator 115 based on one or more factors. For example, the first device 108A and the second device 108B can communicate various types of data to determine if location data 125 of one device, such as the location data 125A of the first device 108A, can be used to determine the location of another device, such as the second device 108B. This example is provided for illustrative purposes and is not to be construed as limiting. It can be appreciated that the configurations disclosed herein can utilize fewer or more devices and/or components than shown in FIG. 2, and any device 108 can use data of any other device 108 to obtain and utilize location data 125 and other data from any number of devices 108.

In some configurations, the individual devices 108 are configured to detect the presence of other devices 108, establish communication with one another, and selectively share and utilize location data 125 depending on one or more factors. For example, the first device 108A and the second device 108B can detect the presence of one another by the use of BLUETOOTH technologies, NFC technologies, WiFi Direct, and/or other technologies. In some configurations, one or more devices 108 can determine the presence of another device 108 when the devices are within a predetermined distance from one another. In some configurations, for example, one or more devices 108 can determine the presence of another device 108 when the devices 108 are within a range that allows a wireless data communication between the devices 108.

In addition, techniques disclosed herein may also involve the verification of access rights to provide security and controlled access to data of each device 108. Generally described, the verification of access rights can include technologies that require user consent to share secured data for privacy purposes. In some configurations, access rights may be managed by one or more techniques. For example, access rights may be controlled by the use of one or more technologies utilizing identities and corresponding passwords, public and private key technologies, and/or user-controlled technologies. User-controlled technologies may involve the display of data identifying one or more near-by devices 108. In response to the displayed data, the user may accept or deny access by the use of a user input.

Some technologies, such as BLUETOOTH technologies, can utilize a user input to verify access rights during an initial set up. Once the access rights are established, the devices 108 may automatically disconnect based on one or more events and re-connect when the devices are within proximity to one another. For example, during an initial setup, the first device 108A and the second device 108B can be paired using a wireless technology, and the devices 108 can maintain records of such a pairing. Access rights can be granted if one or more records indicate that the devices have been previously paired. In some configurations, once the access rights are granted, communication of data may be established between the paired devices. It can be appreciated that implementations may not verify the access rights and thus allow an automatic connection based, at least in part, on the proximity of the devices.

The devices 108 can share public data and private data. Public data, for example, can include identifiers indicating a device type, data that may be used to establish a connection, and/or other data that enables one or more devices to detect the presence of another device. Public data, for example, may include public information used for establishing a connection, e.g., pairing a BLUETOOTH connection or establishing a WI-FI connection. In some configurations, public data may also include location data and a list of device capabilities. Private data, can include a list of device capabilities, e.g., contextual data 123, and other data. In some configurations, private data may also include location data. In some configurations, private data can be communicated after access rights have been established.

Once in communication, each device 108 can selectively communicate aspects of the contextual data 123 and or any other data defining the capabilities of each device 108. For example, as shown in FIG. 3A, the first device 108A may communicate contextual data 123A to the second device 108B. In addition, as shown in FIG. 3B, the devices 108 can exchange the contextual 123 data. In this example, the first device 108A may communicate contextual data 123A to the second device 108B and the second device 108B can communicate contextual data 123B to the first device 108A. In some configurations, the location data 125 of each device 108 can be communicated with the contextual data 123. In some configurations, as shown in FIG. 3A and FIG. 3B, the location data 125 can be communicated separately from the contextual data 123. Any data communicated between the devices 108 can utilize any suitable protocol, which may include a push technology or any other suitable technology, which can include a request and response.

Figure 4A:
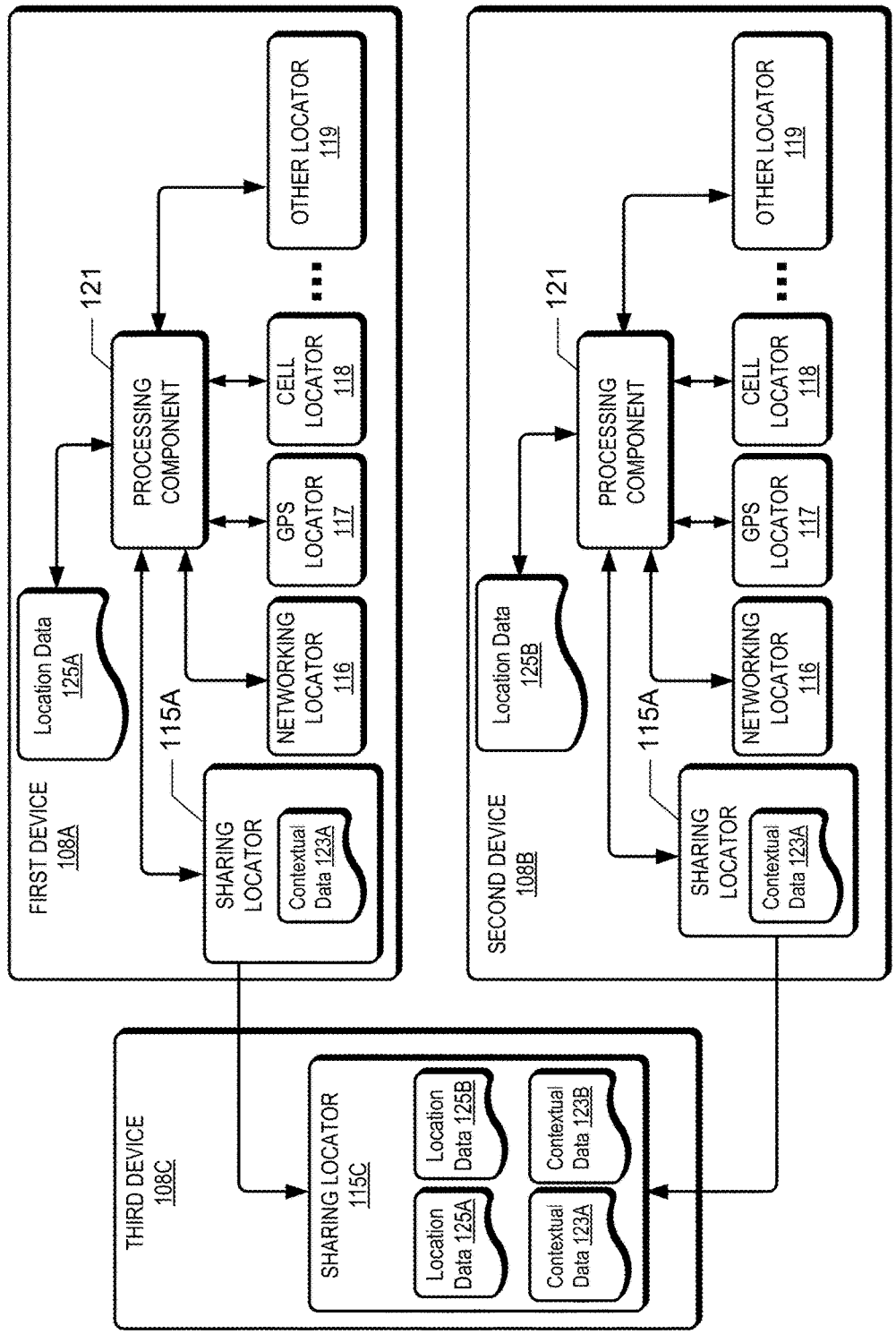
FIGS. 4A-4B illustrate examples of various configurations configured to provide contextually-aware location sharing services.

FIG. 4A illustrates another example configuration that may be used for providing contextually-aware location sharing services for computing devices. In this example, a third device 108C is configured to receive contextual data, such as contextual data 123 from the first device 108A and the second device 108B. Such a configuration illustrates one example where a device can receive and utilize contextual data 123 and/or location data 125 from multiple devices. Examples utilizing such a configuration provided in more detail below.

Once the devices 108 have communicated the contextual data 123, parts of the contextual data 123, or other contextual data, each device 108 receiving such data can determine if the location data 125 of a remote device can be used to determine a location of the receiving device 108. For example, with reference to FIG. 3A, the location data 125A of the first device 108A can be selected and utilized by the second device 108B based on one or more factors. In the example of shown in FIG. 3B, the devices 108 can both share location data 125. The location data 125A of the first device 108A can be selected and utilized by the second device 108B based on one or more factors. In addition, the location data 125B of the second device 108B can be selected and utilized by the first device 108A based on one or more factors. With reference to the example of FIG. 4A, the third device 108C can select and utilize the location data 125A of the first device 108A and/or the location data 125B of the second device 108B.

In some configurations, the factors used for selecting location data 125 can be derived from any received data, such as the contextual data 123 or any contextual data. For example, the factors used for selecting location data 125 can be based on a level of accuracy of the location data and/or a level of resources associated with the location data. Other contextual data, such as data indicating the movement of a device, can be used as a factor for selecting location data 125. As will be illustrated by the following examples, the use of the one or more factors enables techniques disclosed herein to balance the accuracy of the location data 125 and resources associated with the location data 125 to accommodate one or more scenarios.

Figure 4B:
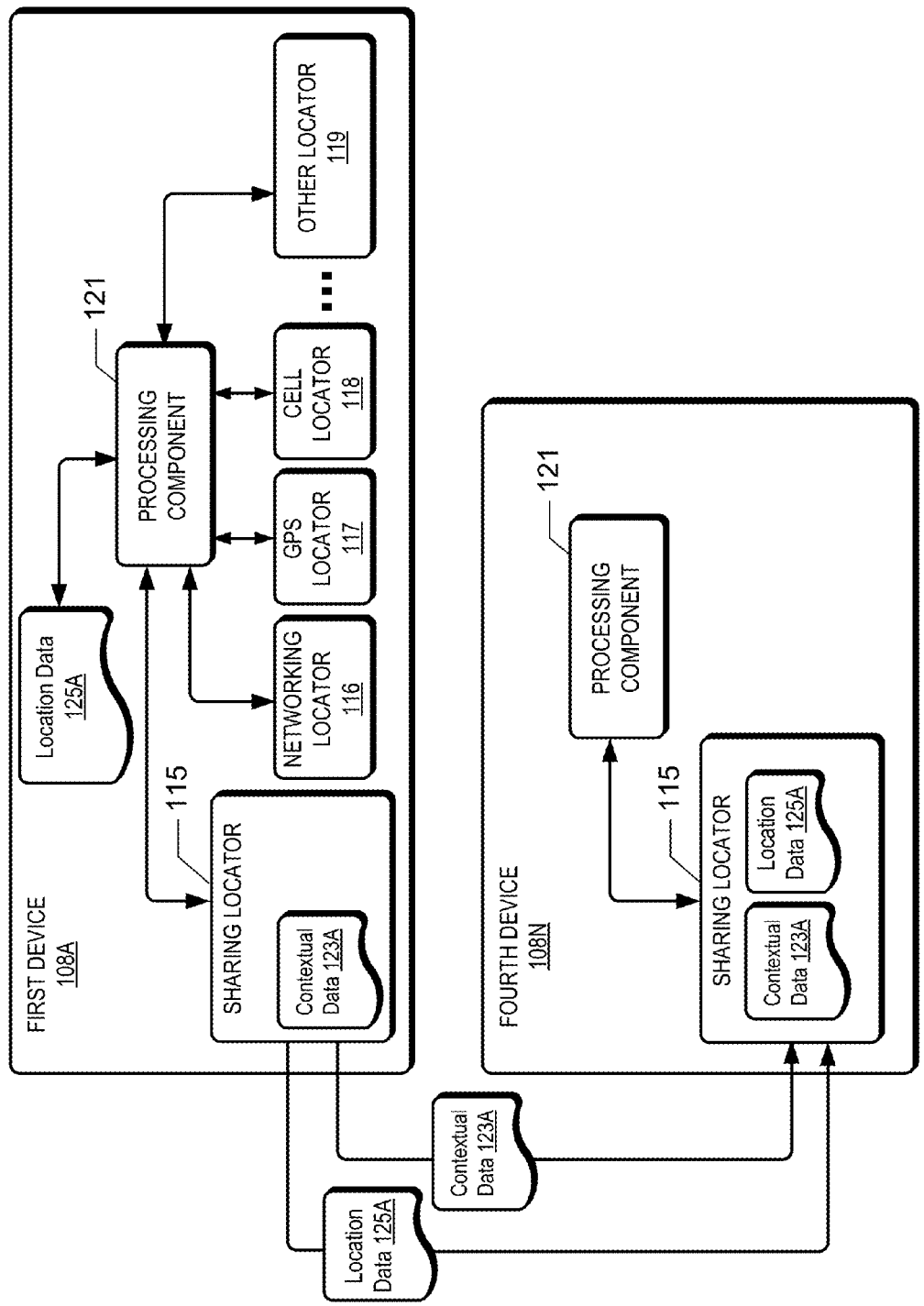

With reference to FIG. 4B, in one example, consider a scenario where the first device 108A is mobile phone having highly accurate location data 125A derived from a location tracking component, such as the GPS locator 117. In this example, the fourth device 108N is a tablet computer that does not have a location tracking component, such as a cell locator 118 or a GPS locator 117. The fourth device 108N, in this example, is configured with a sharing locator 115. Although this example and other examples illustrate shared location data communicated through the sharing locator on 115, it can be appreciated that and the shared location data 125 may be communicated through any other suitable component of the devices 108.

By use of the techniques disclosed herein, when such a scenario shown in FIG. 4B is presented, one or more processing components 121 can determine that the location data 125A of the first device 108A is present and the location data 125B of the fourth device 108N is not present. Based on the detection of such a scenario, which can be derived from an interpretation of contextual data 123 communicated between the two devices, the fourth device 108N can make a determination to receive the location data 125A of the first device 108A, and utilize the location data 125A of the first device 108A to determine the location of the fourth device 108N.

In another example, which is illustrated in FIG. 2 and FIG. 3A, the first device 108A is mobile phone having location data 125A derived from a component, such as the cell locator 118. In this example, the second device 108B is a tablet computer having location data 125B derived from a component, such as the networking locator 116. In this example, it is a given that contextual data, such as the accuracy data 126, from either or both devices indicates that the location data 125A of the first device 108A is more accurate than the location data 125B of the second device 108B. In addition, it is a given that that contextual data, such as the resource data 127, of either or both devices indicates that the first device 108A consumes less power by obtaining and utilizing the location data 125B derived from the networking component of second device 108B versus obtaining and utilizing the location data 125A derived from the component of the first device 108A.

The configuration of the present example can be used to accommodate a number of dynamically changing scenarios. For example, if the location data 125B of the second device 108B meets and accuracy requirement of an application, the second device 108B can select the location data 125B of the second device 108B for use. However, if the user starts to use a second application requiring a level of accuracy that exceeds the accuracy of the location data 125B, the second device 108B may select and utilize the location data 125A derived from the component of the first device 108A. This example is provided for illustrative purposes not to be construed as limiting. Other examples utilizing a number of factors to select location data are provided below.

As illustrated by the examples disclosed herein, the contextual data can also indicate a status of an application, device, or component. For example, a device can generate status data indicating that the device is operating from battery power. In another example, a device can generate status data indicating that a status of an application or operating system component has changed or has reached a threshold. In yet other examples, status data may indicate that data has become available or that a price of data from a service has changed. These examples are provided for illustrative purposes and are not to be construed as limiting.

In addition, contextual data can be interpreted to determine a requirement with respect to a resource or a level of accuracy. For instance, the contextual data may indicate that a device 108 is executing an application configured for surveying the topography of a construction site. In such a scenario, a device can determine a requirement indicating a need for a high level of accuracy with respect to the location data. Conversely, the contextual data may indicate that a device 108 is executing a retail application configured to determine a city and state of a user. In such a scenario, a device herein may determine a requirement indicating a need for a low level of accuracy with respect to the location data. In another example, contextual data may indicate that a device 108 is operating from a battery power supply. In such a scenario, the device 108 can determine a requirement indicating a need to conserve energy.

In another example, a device 108 operating from an external power supply, e.g., an AC outlet or a car charger, may determine a requirement indicating that energy conservation is not a high priority. In addition, adding to the current example, if the contextual data indicates the use of an application requiring a high level of accuracy with respect to the location data while the device is operating from a battery, the device can be configured to select and use the component generating the most accurate location data, e.g., a GPS component, even if the component generating the most accurate location data is not the most energy efficient resource. It can be appreciated that the techniques disclosed herein may determine and utilize any number of requirements.

Techniques disclosed herein can also detect the presence of a changed scenario, and take one or more actions based on the changed scenario. A changed scenario, for example, can include any change with respect to the status of a hardware or software component, a modification of any data, the detection of new data, a status change of a service or program, a user input, and/or any other event. Such configurations allow devices to optimize a balance between the accuracy of the location data and a level of resources that are associated with the location data based on contextual data indicating the changed scenario. For example, a device may be configured to alternately utilize a battery power source or an external power source, such as an AC outlet. When plugged into an external power source, the device can be configured to obtain location data utilizing a technology, such as a GPS component, that may have a higher level of accuracy but may consume power at a high rate. The device can be configured to detect a changed scenario, such as a transition from the external power source to the use of the battery power source. In such a scenario, the device can identify the changed scenario and select another resource providing location data, such as a resource using an energy-efficient technology.

To enable aspects of the technologies described herein, a device can be configured to share contextual data indicating the device's capabilities. In some configurations, a device can publish contextual data, such as contextual data 123, defining what the device can provide to another device. A device receiving the published data can maintain a list of devices and their respective capabilities. A device 108 can also send requests to other devices 108 for a list of desired capabilities. For illustrative purposes, a list of information that can be shared between devices 108 can include but is not limited to: high accuracy indoor position data, high accuracy position data derived from a GPS, neighboring tile data for local inference of positions based on a cell system, WI-FI system data, IBEACON system data, system data for a GPS, venue tile information and/or other data.

The one or more factors used to select or prioritize resources of location data 125 can be based on any contextual data describing a scenario or a changed scenario. For example, contextual data may define parameters of motion, e.g., the speed and direction a device may be traveling, performance of one or more tasks, or other measurement data generated from a sensor or input device. In addition, the contextual data can include but is not limited to data indicating the detection or availability of resolved positions satisfying one or more requirements for location sharing. The one or more requirements obtained or derived by techniques disclosed herein can include but is not limited to: accuracy, freshness, technology confidence, and whether higher accuracy indoor positioning data is available, and so on.

As summarized above, the selection of location data 125 may involve a process of prioritizing location data 125 from different resources. For example, location data 125 having a higher accuracy can be placed at a higher priority than location data 125 having a lower accuracy. In another example, location data having WI-FI-based indoor position data with some specific additional criteria, e.g., the device 108 being stationary and requiring minimal accuracy variation, can be placed at a higher priority than other location data defining an outdoor position using WI-FI technologies or other technologies.

In yet another example, location data 125 defining a freshly resolved position, i.e., refreshed within 5-10 seconds, by a close-by device can be placed at a higher priority than location data 125 that may not be as fresh, e.g., minutes old, but having a higher level of accuracy. A device 108 may determine such a priority order if other contextual data indicates that the device 108 is moving. However, the device 108 can be configured to reverse or modify the aforementioned priority if the device 108 has not moved within a pre-determined time period.

It can be appreciated that devices 108 utilizing the techniques disclosed herein can optimize a balance between a required level of accuracy and various resource efficiencies to accommodate a wide range of scenarios involving different types of devices having a wide range of capabilities. For example, techniques disclosed herein may utilize the location data 125 and/or other data from accelerometers or other sensors to determine if an object is moving. In such configurations, a device may analyze different types of contextual data 123 describing the capabilities of one or more devices 108. Based on the analysis of such data and other contextual data, a device 108 may select and utilize location data 125 including WI-FI-based indoor position data over location data 125 including WI-FI-based outdoor or GPS position if user is not driving. In another scenario, a device 108 may determine that a user is walking instead of driving. Contextual data defining such a scenario may be derived by an interpretation of the speed, direction, and location of the device 108. Thus, in a scenario where a user is walking with a device 108, the device 108 can select and utilize location data 125 from either a GPS or an Indoor position system, instead of selecting location data 125 from an outdoor WI-FI position system.

In another example, detection of contextual data indicating that a device 108 is traveling at a high speed, e.g., while a user is driving, can cause the device 108 to select and prioritize one or more types of location data 125. In such a scenario, use of location data 125 from the GPS locator 117 may be prioritized higher than the location data 125 from the sharing locator 115. Such features may prevent or mitigate the use of location sharing in an effort to mitigate the use of unnecessary resources.

Configurations disclosed herein may also utilize contextual data based on timestamps and/or expiration dates of system data 128, location data 125, accuracy data 126, resource data 127, and other data. For example, a device 108 can be configured to detect the availability of downloaded Ephemeris and server time data of another near-by device. Based on one or more factors, the device 108 can also identify a need to download such data from a server or other network-based service. A need to download or obtain data can be based on the analysis of self-maintained data, e.g., an "about-to-expire" time stamp that is provided by any device or component, such as the sharing locator 115 or by the cell locator 118, or related software drivers. A device 108 can be configured to prioritize one or more types of location data 125 from one or more resources based, at least in part, on the availability or need of such data.

The configurations disclosed herein can also detect the availability of venue metadata and/or venue model data to help resolve higher accuracy indoor positions locally. In some configurations, such data can be expensive to download and techniques disclosed herein may consider a price point of the data in determining if the data is to be utilized to locate a device. Contextual data involving a price point may be compared to one or more thresholds. In a model where location data and other data is associated with a fee, a device 108 can be configured to utilize such location data 125 when an associated fee or another like value reaches a threshold. Such configurations enable techniques disclosed herein to utilize data in the presence of a contextually relevant scenario.

The use of contextual data, which may also be provided by other systems, such as an emergency service system, allows a device 108 to select or prioritize of different types of location data 125 to accommodate scenarios that require immediate action and/or accurate location data 125. For example, if a device 108 receives contextual data indicating an emergency, the device may select a resource that provides highly accurate location data 125 for a predetermined time period or when the device receives contextual data indicating the scenario has changed.

As summarized above, a device 108 may be configured to detect a status of a hardware or software component, such as the introduction of a battery saving mode. In such a scenario, the device 108 can select and utilize location data 125 of a nearby device, instead of downloading location data 125 from a service provider or other network-based service. This example is provided for illustrative purposes and is not to be construed as limiting. It can be appreciated that any type of status or mode generated by a device 108 may be utilized to prioritize, re-prioritize, or select location data 125 from different resources.

In yet another example, a device 108 may obtain location data 125 obtained from an IBEACON service, which may be costly in terms of the computing power required to generate the location data 125. At the same time, the device 108 may also obtain freshly resolved location data 125 from a close-by device via location sharing. In such a scenario, the device can utilize the freshly resolved location data 125, as it may be less costly to share data rather than to compute the data. This example is provided for illustrative purposes is not to be construed as limiting. The techniques disclosed herein may utilize any type of timestamp, e.g., the freshness of any type of data to select and/or prioritize different types of location data 125. For instance, data indicating the freshness of system data 128 may be utilized to select or prioritize location data 125 that may be received by or calculated from the cell locator 118 or another like device or component.

Again, the examples provided herein are for illustrative purposes and are not to be construed as limiting. It can be appreciated that the criteria for selecting location data 125 can be much more complex than the examples provided herein. Many variations may be applied to the factors described above. Different combinations of different types of information may be utilized in the selection of the location data 125 or the selection of resources providing location data 125. It can be also appreciated that resource conservation may not be a priority. In some situations, the need for accurate location data 125 may override a factor involving resource conservation. The number of factors should not be limited to those listed herein, since any available contextual information available can be used to select location data 125, trigger a need to share location data 125, and/or trigger a need to received shared location data 125. Also, the factors can be used for triggering resource sharing and for deterring a device from sharing location data 125. Among many other benefits, such configurations can help devices optimize its resource efficiency and lower usage costs.

Figure 5:
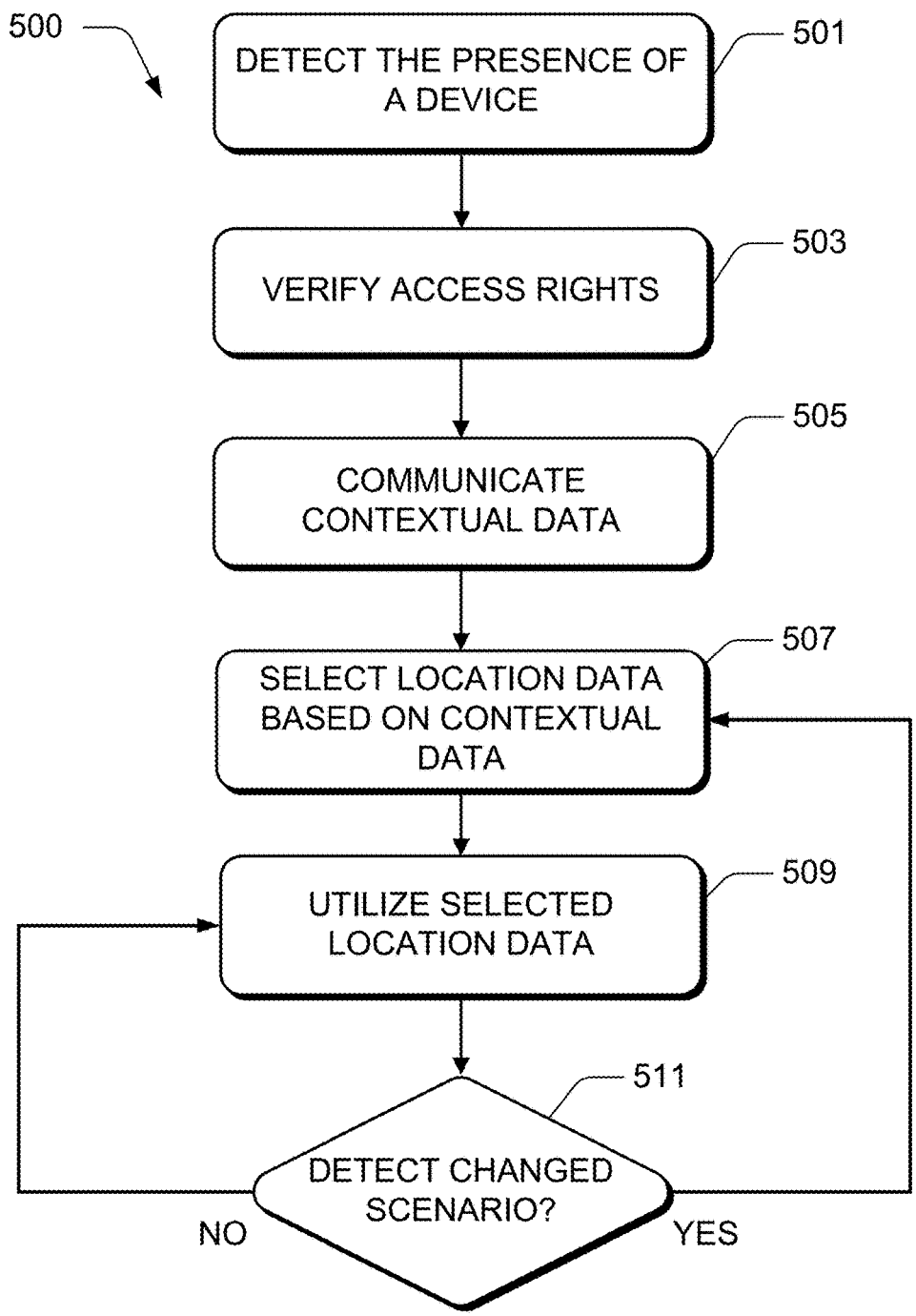
FIG. 5 is a flow diagram illustrating a routine that can be used for providing contextually-aware location sharing services for computing devices.

Turning now to FIG. 5, aspects of a routine 500 for providing contextually-aware location sharing services for computing devices are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in conjunction with FIG. 1, the operations of the routine 500 are described herein as being implemented, at least in part, by an application, component and/or circuit, such as the processing component 121. Although the following illustration refers to the components of FIG. 1, it can be appreciated that the operations of the routine 500 may be also implemented in many other ways. For example, the routine 500 may be implemented, at least in part, by computer processor or processor of another computer. In addition, one or more of the operations of the routine 500 may alternatively or additionally be implemented, at least in part, by a chipset working alone or in conjunction with other software modules. Any service, circuit or application suitable for providing contextual data indicating the position or state of any device may be used in operations described herein.

With reference to FIG. 5, the routine 500 begins at operation 501, where devices 108 detect the presence of one another. In one illustrative example, the first device 108A and the second device 108B can detect the presence of one another and enable communication between the devices by the use of one or more technologies including but not limited to BLUETOOTH, NFC, and/or other suitable technologies. In some configurations, one or more devices 108 can determine the presence of another device 108 when the devices are within a predetermined distance from one another. In some configurations, for example, one or more devices 108 can determine the presence of another device 108 when the devices 108 are within a range that allows a wireless data communication between the devices 108. Any suitable technology for detecting the presence of a device may be used in operation 501.

Next, in operation 503, the routine 500 can involve the verification of access rights to provide security and controlled access to data of each device 108. In some configurations, access rights may be managed by one or more techniques. For example, access rights may be controlled by the use of one or more technologies utilizing identities and corresponding passwords, public and private key technologies, and/or user-controlled technologies. User-controlled technologies may involve the display of data identifying one or more near-by devices 108. In response to the displayed data, the user may grant or deny access by the use of a user input.

Some technologies, such as BLUETOOTH or WiFi Direct technologies, can utilize a user input to verify access rights during an initial set up. Once the access rights are established, the devices 108 may automatically disconnect based on one or more events and re-connect when the devices are within proximity to one another. For example, during an initial setup, the first device 108A and the second device 108B can be paired using a wireless technology, and the devices 108 can maintain records of such a pairing. Access rights can be granted if one or more records indicate that the devices have been previously paired. In some configurations, once the access rights are granted, communication of data may be established between the paired devices. It can be appreciated that implementations may not verify the access rights and thus allow an automatic connection based, at least in part, on the proximity of the devices.

Next, at operation 505, the one or more devices that are in communication share contextual information. In some configurations, devices in communication with one another can share contextual data indicating the capabilities and/or status information with respect to components and applications of the individual devices. As shown in FIG. 3A and in FIG. 3B, the communication of data may be in a single direction or bidirectional. The techniques disclosed herein may utilize a number of protocols for communicating data between two devices, including push technologies or other technologies utilizing individual requests for data.

In some configurations, the contextual data can include location data defining a location of the device. In addition, the contextual data can include accuracy data indicating the accuracy of the location data, resource data indicating a level of resources associated with the location data, and other data. Each device can also receive contextual data from other resources, such as a remote server or other computing device. The resource data can indicate a level of resources required to obtain or compute the location data. For example, the resource data may indicate a level of power, bandwidth, memory usage, or any other type of cost associated with, or required, to obtain or compute the location data. The contextual data received by individual devices 108 can also include other data such as system data 128 from a cellular network or other data from one or more servers. Contextual data can also be provided by one or more resources such as those shown in FIG. 7.

Next, at operation 507, the individual devices can select and/or prioritize location data from one or more resources based, at least in part, on the contextual data. As summarized above, techniques disclosed herein can determine a requirement, analyze contextual data, and/or select location data. As described herein, location data may be selected and/or prioritized to meet a requirement of a software component and/or a hardware component. In addition, location data may be selected and/or prioritized to balance a level of accuracy and a level of resources associated with the location data to accommodate a detected scenario.

Any combination of factors can be derived from the contextual data, such as accuracy data, system data, resource data and other data. In addition, it can be also appreciated that resource conservation may not be a priority. In some situations, for example, the need for accurate location data 125 may override a factor involving resource conservation. The number of factors should not be limited to those listed herein, since any available contextual information available can be used to select location data 125, trigger a need to share location data 125, and/or trigger a need to received shared location data 125. Also, the factors can be used for triggering resource sharing and for deterring a device from sharing location data 125. Among many other benefits, such configurations can help devices optimize its resource efficiency and lower usage costs.

As described in the examples, different types of location data, i.e., location data received from the sharing locator, location data received from a networking locator, location data received from a GPS locator, and other resources, can be selected and/or prioritized depending on one or more factors. It can be appreciated that location data from multiple resources may be utilized simultaneously. It can also be appreciated that a device may be configured to prioritize different types of location data such that location data of a first resource may be utilized before location data of a second resource. In such configurations, the location data of the second resource may be utilized when the location data of the first resource is no longer available. These examples are provided for illustrative purposes and are not to be construed as limiting.

Next, at operation 509, one or more devices may utilize the selected and/or prioritized location data 125. In operation 509, location data 125 may be utilized by any software or hardware component. It can be appreciated that data may be utilized by a local component or the selected location data 125 may be communicated to another remote computing device. For example, selected location data 125 may be communicated to a remote device to enable location sharing with such devices. Output data of a device may include location data 125 and/or any other type of contextual data.

Next, at operation 511, one or more devices may detect the presence of a changed scenario. As summarized above, a changed scenario may include the detection of any event, such as a changed status of a hardware or software component, a modification of any data, the detection of new data, a price change of data from a service, a user input and/or any other event. For example, a device may be configured to operate from a battery power source or an external power source, such as an AC outlet. In this non-limiting example, a changed scenario may include the transition from the battery power source to the external power source. Operation 511 can include the detection of any type of event, such as the examples described herein.

At operation 511, if the one or more devices do not detect a changed scenario, the routine 500 can return to operation 509 where the one or more devices continue to utilize the selected and/or prioritized location data. However, at operation 511, if the one or more devices detects a changed scenario, the routine 500 can return to operation 507 where the one or more devices may utilize any updated contextual data to select and/or prioritize location data 125 from one or more resources.

Figure 6:
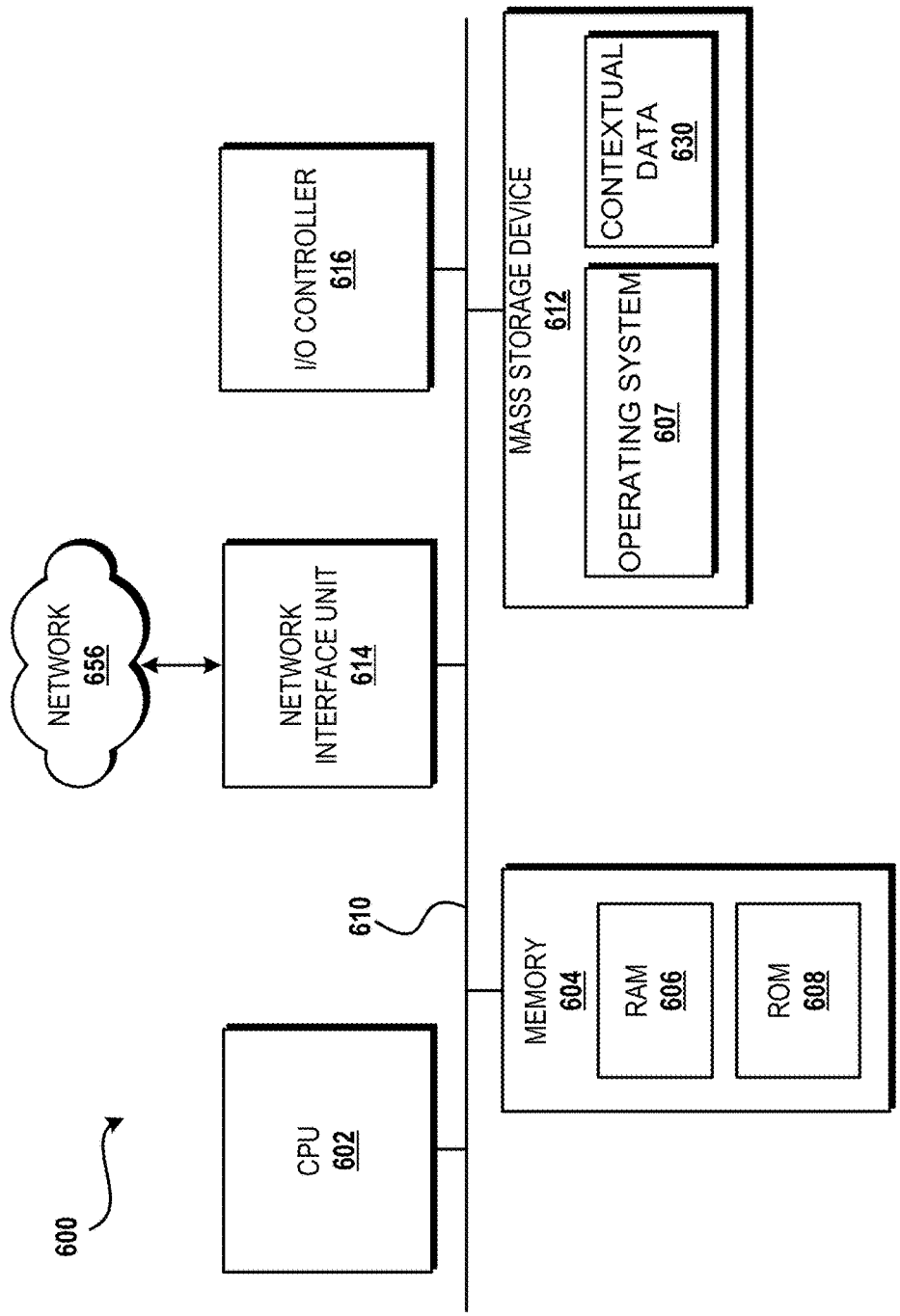
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as the computing device 101 (FIG. 1), capable of executing the program components described above for providing contextually-aware location sharing services for computing devices. Thus, the computer architecture 600 illustrated in FIG. 6 illustrates an architecture for a server computer, mobile phone, a PDA, a smart phone, a desktop computer, a netbook computer, a tablet computer, a laptop computer, companion devices (e.g., smart watches), and non-consumer devices (e.g., telematics device in an automobile) and the like. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607 and other data, such as the contextual data 630.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
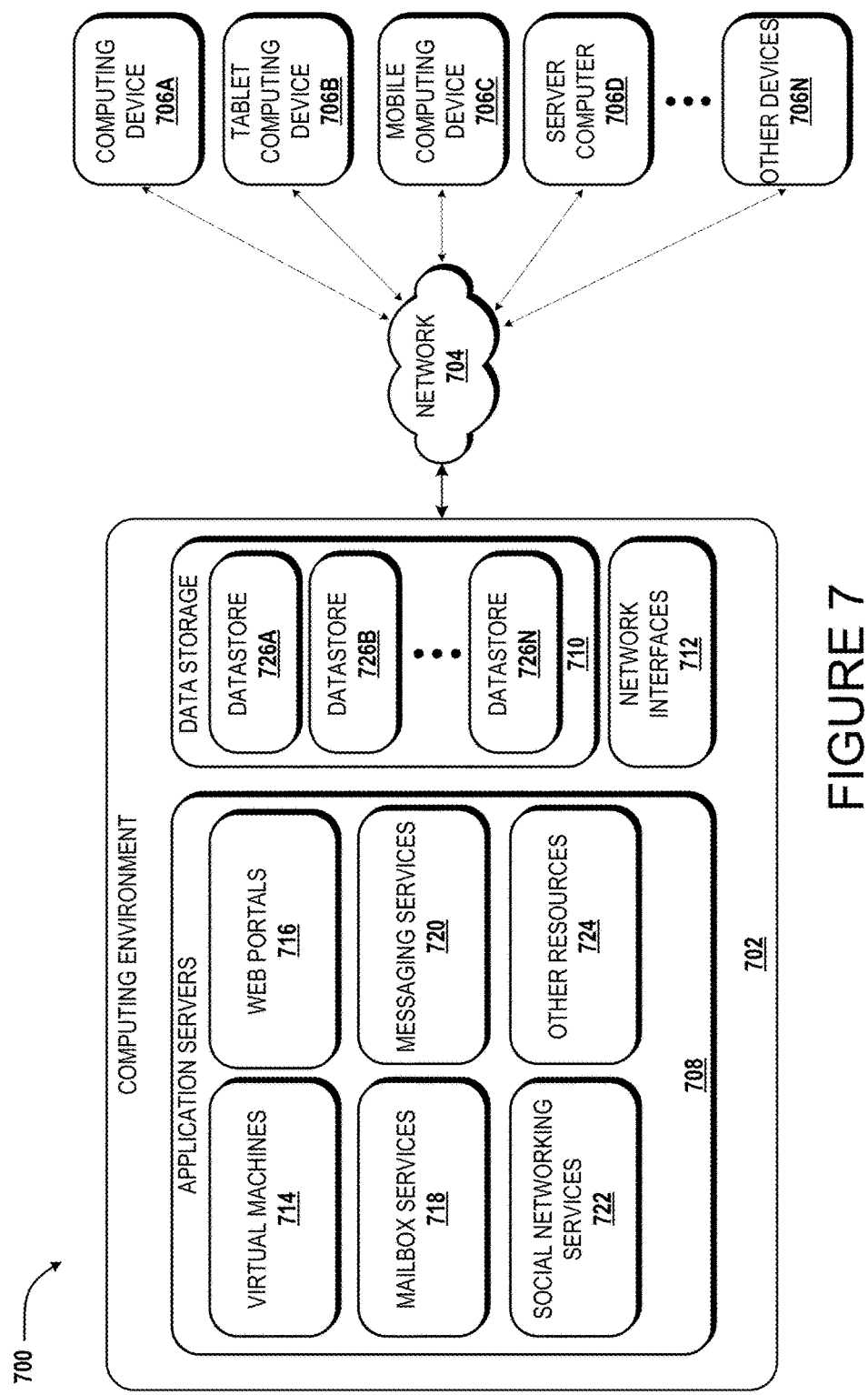
FIG. 7 is a diagram illustrating a distributed computing environment capable of implementing aspects of the techniques and technologies presented herein.

FIG. 7 depicts an illustrative distributed computing environment 700 capable of executing the software components described herein for providing contextually-aware location sharing services for computing devices, among other aspects. Thus, the distributed computing environment 700 illustrated in FIG. 7 can be utilized to execute any aspects of the software components presented herein. For example, the distributed computing environment 700 can be utilized to execute aspects of the techniques disclosed herein.

According to various implementations, the distributed computing environment 700 includes a computing environment 702 operating on, in communication with, or as part of the network 704. The network 704 may be or may include the network 656, described above with reference to FIG. 6. The network 704 also can include various access networks. One or more client devices 706A-706N (hereinafter referred to collectively and/or generically as "clients 706") can communicate with the computing environment 702 via the network 704 and/or other connections (not illustrated in FIG. 7). In some configurations, the clients 706 can be configured in a manner that is similar to the clients 108 of FIG. 1. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for providing contextually-aware location sharing services for computing devices. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein for providing contextually-aware location sharing services for computing devices. For instance, any one of the application servers 708 may communicate or facilitate the functionality and features described herein. For instance, a social networking application, mail client, messaging client, a browser running on a phone or any other client 706 may communicate with a networking service 722 and facilitate the functionality, even in part, described above with respect to FIG. 5.

As shown in FIG. 7, the application servers 708 also can host other services, applications, portals, and/or other resources ("other resources") 724. The other resources 724 can include, but are not limited to, document sharing, rendering or any other functionality. It thus can be appreciated that the computing environment 702 can provide integration of the technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 7, the datastores 726 also can host or store web page documents, word documents, presentation documents, data structures, algorithms for execution by a recommendation engine, and/or other data utilized by any application program or another module, such as the content manager 105. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the clients 706 and the application servers 708. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various configurations of the technologies disclosed herein enable any device configured to access the distributed computing environment 700 to utilize the functionality described herein for providing contextually-aware location sharing services for computing devices, among other aspects. In one specific example, as summarized above, techniques described herein may be implemented, at least in part, by the operating system 607 of FIG. 6, which works in conjunction with the application servers 708 of FIG. 7.

Turning now to FIG. 8, an illustrative computing device architecture 800 for a computing device that is capable of executing various software components described herein for providing contextually-aware location sharing services for computing devices. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the clients 806 shown in FIG. 8. Moreover, aspects of the computing device architecture 800 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 8 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some configurations, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 704 of FIG. 7. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

The disclosure presented herein may be considered in view of the following clauses.

Clause A: A computing device, comprising: a processor; a memory having computer-executable instructions stored thereupon which, when executed by the processor, cause the first computing device to receive contextual data from a plurality of resources that are individually configured to provide location data, the contextual data comprising resource data indicating a level of resources associated with the location data; select one or more resources of the plurality of resources based, at least in part, on the resource data indicating a level of resources associated with the location data; and determine a location of the computing device based, at least in part, on the location data provided by the one or more resources.

Clause B: A computing device, comprising: a processor; a memory having computer-executable instructions stored thereupon which, when executed by the processor, cause the first computing device to receive contextual data from a plurality of resources that are individually configured to provide location data, the contextual data comprising resource data indicating a level of resources associated with the location data, the contextual data comprising accuracy data indicating a level of accuracy associated with the location data; select one or more resources of the plurality of resources based, at least in part, on the accuracy data and the resource data; and determine a location of the computing device based, at least in part, on the location data provided by the one or more resources.

Clause C: A computer-implemented method, comprising: detecting, at a first device, a presence of a second device; verifying, at the first device, an authorization to initiate communication between the first device and the second device; sending, from the first device, contextual data comprising accuracy data indicating a level of accuracy associated with location data defining a location of the first device, the contextual data further comprising resource data indicating a level of resources associated with the location data; receiving a request for the location data; and sending the location data to the second device.

Clause D: A computer-implemented method, comprising: detecting, at a first device, a presence of a second device; verifying, at the first device, an authorization to initiate communication between the first device and the second device; receiving, at the first device, contextual data from the second device comprising accuracy data indicating a level of accuracy associated with shared location data defining a location of the second device, the contextual data further comprising resource data indicating a level of resources associated with the shared location data; selecting the shared location data or component location data provided by a component of the first device based, at least in part, on the accuracy data and the resource data; if the component location data is selected, determining a location of the first device based, at least in part, on the component location data provided by the component of the first device; and if the shared location data is selected, receiving, at the first device, the shared location data from the second device, and determining the location of the first device based, at least in part, on the shared location data defining the location of the second device.

Clause E: The method of Clause D, further comprising: generating selection data indicating a selection order of the shared location data defining the location of the second device and the component location data provided by the component of the first device based, at least in part, on the accuracy data or the resource data; detecting data identifying a changed scenario; and modifying the selection order of the selection data based, at least in part, on the data identifying the changed scenario, wherein the shared location data or the component location data is selected based, at least in part, on the selection order.

Clause F: The method of Clauses D and E, wherein the first device is configured to operate on a battery power source or an external power source, wherein the data identifying the changed scenario indicates a transition of the first device from the battery power source to the external power source or a transition of the first device from the external power source to the battery power source, and wherein the selection order is modified based, at least in part, on the data identifying the changed scenario.

Clause G: The method of Clauses D-E, further comprising, obtaining freshness data indicating a freshness level of system data associated with a service providing the shared location data, wherein the shared location data or the component location data provided by a component of the first device is selected based, at least in part, on the freshness level of system data.

Clause H: The method of Clauses D-G, further comprising obtaining freshness data indicating a freshness level of the shared location data, wherein the shared location data or the component location data provided by a component of the first device is selected based, at least in part, on the freshness level of the shared location data.

Clause I: The method of Clauses D-H, further comprising obtaining movement data indicating movement of the first device, wherein the shared location data or the component location data provided by a component of the first device is selected based, at least in part, on the movement data indicating movement of the first device.

Clause J: The method of Clauses D-I, further comprising obtaining movement data indicating a rate at which the first device is moving, wherein the shared location data or the component location data provided by a component of the first device is selected based, at least in part, on the movement data indicating the rate at which the first device is moving.

Clause K: The method of Clauses D-J, further comprising receiving contextual data comprising status data indicating a fee associated with system data provided by a service, wherein the shared location data or the component location data provided by a component of the first device is selected based, at least in part, on the fee associated with the system data.

Clause L: A first device, comprising: a processor; and a memory having computer-executable instructions stored thereupon which, when executed by the processor, cause the first computing device to receive contextual data comprising accuracy data indicating a level of accuracy of location data defining a location of a second device, the contextual data comprising resource data indicating a level of resources associated with the location data; determine if the first device is to utilize the location data based, at least in part, on the contextual data; and determine a location of the first device based, at least in part, on the location data defining the location of the second device, if it is determined that the second device is to utilize the location data of the second device.

Clause M: The device of Clause L, wherein the computer-executable instructions further cause the first device to obtain data indicating a freshness level of the system data, wherein determining if the first device is to utilize the location data is based, at least in part, on the data indicating the freshness level of the system data.

Clause N: The device of Clauses L-M, wherein the computer-executable instructions further cause the first device to obtain data indicating a freshness level of the location data, wherein determining if the first device is to utilize the location data is based, at least in part, on the data indicating the freshness level of the location data.

Clause O: The device of Clauses L-N, wherein the computer-executable instructions further cause the first device to receive contextual data comprising status data indicating that system data is available for download from a service provider, and wherein determining if the first device is to utilize the location data is based, at least in part, on the status data indicating that the system data is available.

Clause P: The device of Clauses L-O, wherein the computer-executable instructions further cause the first device to receive contextual data comprising status data indicating a price of system data available from a service provider, wherein determining if the first device is to utilize the location data is based, at least in part, on the price.

Clause Q: The device of Clauses L-P, wherein the computer-executable instructions further cause the first device to: determine if the first device is to share the location data with a third device; and communicate the location data with the third device if it is determined that the first device is to share the location data with the third device.

Clause R: A computing device, comprising: a processor; and a memory having computer-executable instructions stored thereupon which, when executed by the processor, cause the computing device to receive contextual data from a plurality of resources that are individually configured to provide location data, the contextual data comprising resource data indicating a level of resources associated with the location data provided by individual resources of the plurality of resources; select one or more resources of the plurality of resources based, at least in part, on the resource data indicating a level of resources associated with the location data of the individual resources; and determine a location of the computing device based, at least in part, on the location data provided by the one or more resources.

Clause S: The device of Clause R, wherein the contextual data comprises accuracy data indicating a level of accuracy associated with the location data provided by the individual resources, and wherein the computer-executable instructions further cause the computing device to generate threshold data indicating a required level of accuracy; and determine if the accuracy data meets a condition with respect to the threshold data, wherein the one or more resources are selected if the accuracy data meets the condition with respect to the threshold data.

Clause T: The device of Clauses R-S, wherein the selection of the one or more resources is based on contextual data indicating an availability of system data used by the one or more resources.

Clause U: The device of Clauses R-T, wherein the selection of the one or more resources is based on contextual data indicating a fee associated with system data used by the one or more resources.

Clause V: The device of Clauses R-T, wherein the selection of the one or more resources is based on contextual data indicating a freshness value associated with the location data provided by the one or more resources.

Clause W: The device of Clauses R-V, wherein the selection of the one or more resources is based on contextual data indicating a rate of movement of the computing device.

Based on the foregoing, it should be appreciated that technologies have been disclosed herein that provide, among other techniques, contextually-aware location sharing services for computing devices. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. For example, any example referring to the selection or prioritization of location data can also mean the selection or prioritization of one or more resources, e.g., devices and/or components, providing location data. Similarly, the selection of one or more resources providing location can also mean the selection of the location data from the selected resources. Various modifications and changes may be made to the subject matter described herein without following the example configurations and applications illustrated and described, and without departing from the true spirit and scope of the present invention, which is set forth in the following claims.

What is claimed is:

1. A computer-implemented method, comprising:
   detecting, at a first device, a presence of a second device;
   verifying, at the first device, an authorization to initiate communication between the first device and the second device based on user consent to share secured data between the first device and the second device;
   determining a first power consumption level for determining a location by a component of the first device;
   receiving, at the first device, data from the second device comprising shared location data defining a location of the second device, and contextual data comprising resource data indicating a second power consumption level for obtaining the shared location from the second device and timestamp data indicating an age of the shared location data;
   determining a priority for the shared location data based on a level of accuracy indicated in the shared location data and the age of the shared location data and a priority of component location data provided by the component of the first device based on an age of the component location data and based on a level of accuracy indicated in the component location data;
   determining, based on the priority for the shared location data and the priority of the component location data, that the shared location data is to be used, wherein the shared location data is to be used when the second power consumption level is less than the first power consumption level;
   in response to determining that the shared location data is to be used, selecting the shared location data provided by the second device, and
   determining a location of the first device utilizing the determined shared location data defining the location of the second device as the location of the first device.

2. The method of claim 1, further comprising:
   receiving accuracy data indicating a level of accuracy associated with the shared location data;
   generating selection data indicating a selection order of the shared location data defining the location of the second device and the component location data provided by the component of the first device based, at least in part, on the accuracy data or the resource data;
   detecting data identifying a changed scenario; and
   modifying the selection order of the selection data based, at least in part, on the data identifying the changed scenario, wherein the shared location data or the component location data is selected based, at least in part, on the selection order.

3. The method of claim 2, wherein the first device is configured to operate on a battery power source or an external power source, wherein the data identifying the changed scenario indicates a transition of the first device from the battery power source to the external power source or a transition of the first device from the external power source to the battery power source, and wherein the selection order is modified based, at least in part, on the data identifying the changed scenario.

4. The method of claim 1, further comprising, obtaining timestamp data associated with system data associated with a service providing the shared location data, wherein the shared location data or the component location data provided by a component of the first device is selected based, at least in part, on the timestamp data associated with the system data.

5. The method of claim 1, further comprising obtaining movement data indicating movement of the first device, wherein the shared location data or the component location data provided by a component of the first device is selected based, at least in part, on the movement data indicating movement of the first device.

6. The method of claim 1, further comprising obtaining movement data indicating a rate at which the first device is moving, wherein the shared location data or the component location data provided by a component of the first device is selected based, at least in part, on the movement data indicating the rate at which the first device is moving.

7. The method of claim 1, wherein the contextual data further comprises status data indicating a fee associated with system data provided by a service, and wherein the shared location data or the component location data is selected based, at least in part, on the fee associated with the system data.

8. A first device, comprising:
a processor; and
a memory having computer-executable instructions stored thereupon which, when executed by the processor, cause the first device to
determine a first power consumption level for determining a location by a component of the first device;
receive data comprising location data defining a location of a second device and contextual data comprising resource data indicating a second power consumption level for obtaining the location data from the second device and timestamp data indicating an age of the location data;
determining a priority for the location data based on a level of accuracy indicated in the shared location data and the age of the location data and a priority of component location data provided by the component of the first device based on an age of the component location data and based on a level of accuracy indicated in the component location data;
determining, based on the priority for the location data and the priority of the component location data, that the location data is to be used, wherein the location data is to be used when the second power consumption level is less than the first power consumption level;
in response to determining that the location data is to be used, determine a location of the first device utilizing the determined shared location data defining the location of the second device as the location of the first device.

9. The first device of claim 8, wherein the computer-executable instructions further cause the first device to obtain timestamp data associated with the system data, wherein determining that the first device is to utilize the location data is based, at least in part, on the timestamp data associated the system data.

10. The first device of claim 8, wherein the contextual data further comprises status data indicating that system data is available for download from a service provider, and wherein determining that the first device is to utilize the location data is based, at least in part, on the status data indicating that the system data is available.

11. The first device of claim 8, wherein the contextual data further comprises status data indicating a price of system data available from a service provider, wherein determining that the first device is to utilize the location data is based, at least in part, on the price.

12. The first device of claim 8, wherein the computer-executable instructions further cause the first device to:
determine the first device is to share the location data with a third device; and
communicate the location data with the third device when it is determined that the first device is to share the location data with the third device.

13. A computing device, comprising:
a processor; and
a memory having computer-executable instructions stored thereupon which, when executed by the processor, cause the computing device to
determine a first power consumption level for determining a location by a component of the computing device;
receive contextual data from a plurality of resources that are individually configured to provide shared location data, the contextual data comprising resource data indicating a second power consumption level for obtaining the shared location data from at least one resource of the plurality of resources and timestamp data indicating an age of the location data;
determining a priority for the shared location data based on a level of accuracy indicated in the shared location data and the age of the shared location data and a priority of component location data provided by the component of the computing device based on an age of the component location data and based on a level of accuracy indicated in the component location data;
determining, based on the priority for the shared location data and the priority of the component location data, that the shared location data is to be used, wherein the shared location data is to be used when the second power consumption level is less than the first power consumption level; and
in response to determining that the shared location data is to be used, determine a location of the computing device utilizing the shared location data defining a location of the at least one recourse as the location of the computing device.

14. The computing device of claim 13, wherein the contextual data further comprises accuracy data indicating the level of accuracy associated with the location data provided by the individual resources, and wherein the computer-executable instructions further cause the computing device to
generate threshold data indicating a required level of accuracy; and
determine if the accuracy data meets a condition with respect to the threshold data, wherein one or more resources are selected from the plurality of resources if the accuracy data meets the condition with respect to the threshold data.

15. The computing device of claim 13, wherein the contextual data further comprises data indicating an availability of system data used by the one or more resources, and wherein the selection of the one or more resources is further based on the data indicating the availability of the system data.

16. The computing device of claim 13, wherein the contextual data further comprise data indicating a fee associated with system data used by the one or more resources, and wherein the selection of the one or more resources is further based on the data indicating the fee associated with the system data.

17. The computing device of claim 13, wherein the contextual data further comprises data indicating a rate of movement of the computing device, and wherein the selection of the one or more resources is further based on the data indicating the rate of movement of the computing device.

* * * * *